United States Patent [19]

Soutar et al.

[11] Patent Number: 5,644,495
[45] Date of Patent: Jul. 1, 1997

[54] METHOD AND APPARATUS FOR WOW AND FLUTTER ANALYSIS

[75] Inventors: Larry W. Soutar; Ronald W. Dale, both of Kokomo, Ind.

[73] Assignee: Delco Electronics Corporation, Kokomo, Ind.

[21] Appl. No.: 418,356

[22] Filed: Apr. 7, 1995

[51] Int. Cl.⁶ .................................................. G11B 20/22
[52] U.S. Cl. .......................... 364/484; 364/576; 324/620
[58] Field of Search ................................. 364/484, 480, 364/481, 576, 575; 324/620, 624, 76.77, 76.39, 76.66; 360/73.12, 73.13

[56] References Cited

U.S. PATENT DOCUMENTS 3,699,949  10/1972  O'Hanlon, Jr. et al. ......... 324/76.66 X
5,293,520   3/1994  Hayashi ............................. 324/76.77
5,420,516   5/1995  Cabot ................................. 324/620

*Primary Examiner*—Emanuel T. Voeltz
*Assistant Examiner*—M. Kemper
*Attorney, Agent, or Firm*—Jimmy L. Funke

[57] ABSTRACT

Wow and flutter of a tape player is measured by playing a recording of a constant frequency test tone, digitally sampling and storing each period of the tone over a test interval, subtracting the average period from each period to obtain deviation data, calculating the FFT of the deviation data, and then calculating power magnitude and wow and flutter. The apparatus includes an interface board which squares the signals from the player, and a desktop computer having a timing board for gating a counter for each square wave pulse to sample the periods, a memory for storing the samples, and a CPU programmed to analyze the samples according to the test method.

7 Claims, 2 Drawing Sheets

METHOD AND APPARATUS FOR WOW AND FLUTTER ANALYSIS

FIELD OF THE INVENTION

This invention relates to analysis of audio equipment and particularly to the measurement of wow and flutter in tape decks.

BACKGROUND OF THE INVENTION

Audio tape players have a motor for driving the tape hopefully at a constant rate. A common problem with such devices is that the motor speed tends to undulate about a desired rate and the sound frequency wavers from its ideal. Depending on the frequency of the deviation, this sound aberration is called wow or flutter. To assure acceptable quality of tape players at the time of manufacture or purchase, the wow and flutter is measured to determine whether the deviation is within prescribed standards. The measurement entails playing a tape of a constant tone and analyzing the resulting tone for frequency deviations.

Typically instruments for measuring wow and flutter comprise an FM detector and an analog low pass filter to process the tone signal by isolating the deviation, and a meter to indicate the deviation. In a system for checking a large number of tape decks, a test controller comprising a desktop computer controls the wow and flutter detector and monitors the output. The stand alone detector combined with a test controller is expensive.

SUMMARY OF THE INVENTION

It is therefore an object of the invention to measure wow and flutter in a tape player by a digital method. Another object is to eliminate the dedicated stand-alone wow and flutter detector and obtain the same measurement at a lower equipment cost.

An interface board coupled to the tape player output shapes the substantially sinusoidal tone pulsations into square wave pulses and feeds the pulses to the timing input board of the test controller or computer. The computer digitally determines the wow and flutter. Thus the dedicated wow and flutter detector is eliminated and the test controller, which is already needed, does the analysis.

The interface board has an amplifier for gain, a bandpass filter to pass only frequencies near the recorded tone, a comparator to square the lobes of the signal, and a divider to eliminate half the zero crossings of the square wave to produce square pulses equal in period to the corresponding sinusoidal pulses. The square wave pulses are fed to a timer board of the computer.

The timer board includes a gate controlled by the square wave pulses to meter clock pulses to a counter. The total count registered for each square wave pulse is a measure of pulse width and is stored in computer RAM for a test interval, about one second. The computer software analyzes the deviation of pulse widths by first averaging the pulse widths and then subtracting the average from each stored pulse, yielding an amplitude modulated waveform of period deviations due to motor speed variance. Then FFT (fast Fourier transform) techniques are applied to the waveform to provide a true RMS measurement, and the RMS measurement is calibrated to provide the wow and flutter value. A digital weighting filter is applied to the waveform if a weighted measurement is desired.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

Figure 1:
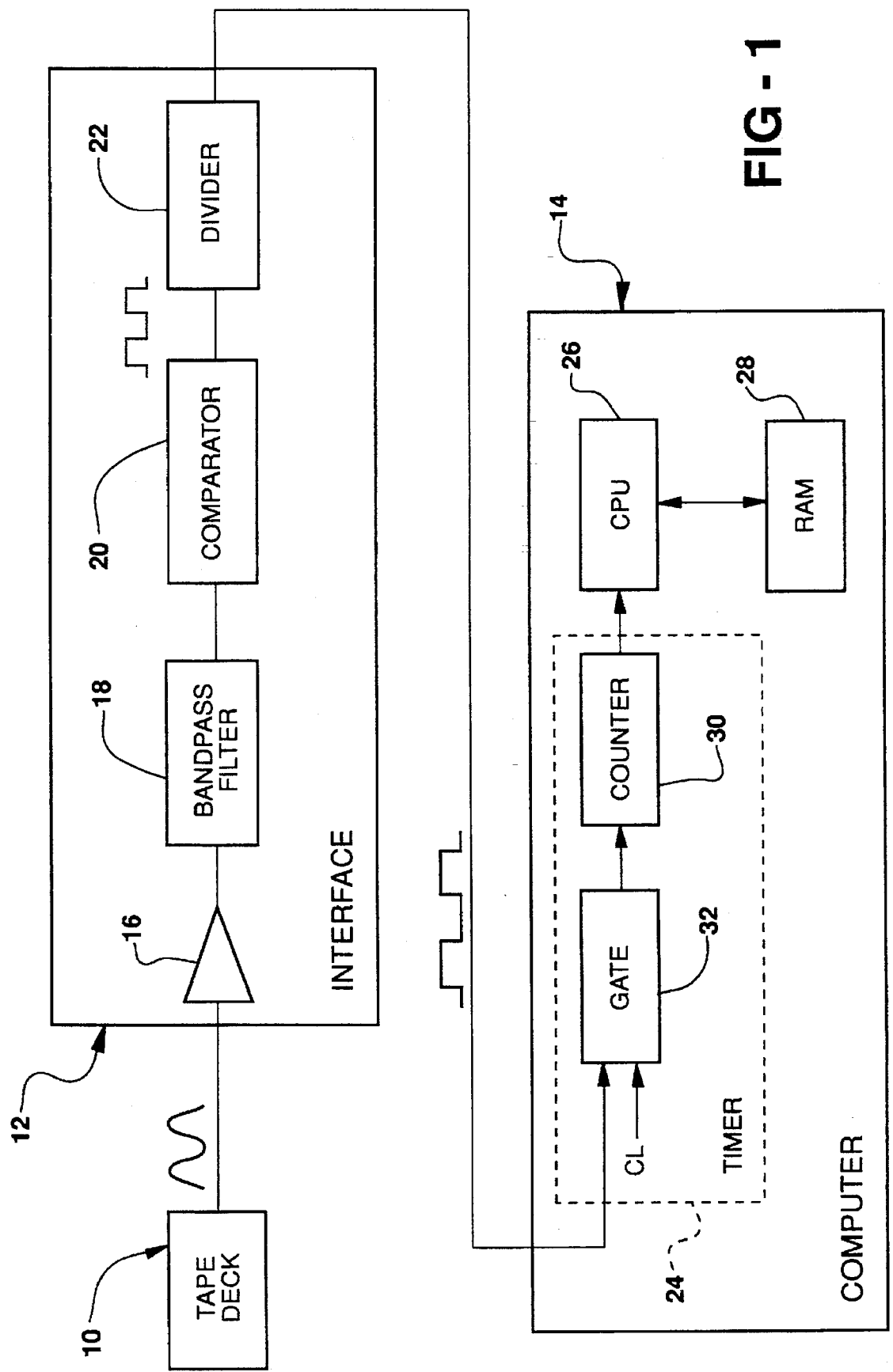
FIG. 1 is a block diagram of wow and flutter analysis apparatus according to the invention.

Referring to FIG. 1, a tape deck or player 10 to be tested has its output connected to an interface board 12 for waveshaping, and the interface board output is connected to a desktop computer 14 for processing. The computer 14, in addition to analyzing the tape player output for wow and flutter, monitors the testing of a plurality of tape decks in succession and accumulates and processes the test results.

The tape deck 10 is provided with a test tape containing a recording of a constant tone, typically a 3 kHz sine wave. The output signal will then be a 3 kHz sinusoidal signal modified according to aberrations in the speed of the drive motor. If the speed is above or below the ideal speed the output frequency will be offset from the recorded frequency. If the motor speed is variable, the frequency will vary about some average value to cause a wavering tone or wow and flutter. The frequency and amplitude of such frequency variation is the parameter to be measured by the apparatus comprising the interface 12 and the computer 14.

The interface board has an amplifier 16 at its input to increase the audio signal from the tape deck 10 followed by a bandpass filter 18 which removes noise which is far removed from the fundamental recorded frequency. A comparator 20 receives the filtered signal and is set to produce a square wave comparable to the sinusoidal audio signal. Since the square wave has two zero crossings for each period of the audio sinusoid, a divide-by-two circuit 22 reduces the signal to one zero crossing per period. Thus the time between adjacent output pulses is the pulse period.

The computer 14 has a timer board 24, a CPU 26 and a RAM 28 along with output devices and other elements, not shown, which are common to desktop computers. The timer board 24 has a counter 30 operated by a gate 32 which is coupled to a timer port which receives the square wave output of the interface 12. A clock signal is generated on the timer board 24 and is fixed at 5 MHz. The square wave output of the interface 12 controls when the gate 32 passes the clock signal to counter 30. The counter accumulates clock pulses between adjacent input pulses and the total count is saved to RAM 28, and the counter is reset upon the receipt of each new input pulse. The succession of counts stored in the RAM thus represent the successive periods of the audio signal. The test continues typically for one or two seconds and all the period measurements in the test interval are stored. The computer then analyzes the data set of period samples to measure wow and flutter.

Figure 2:
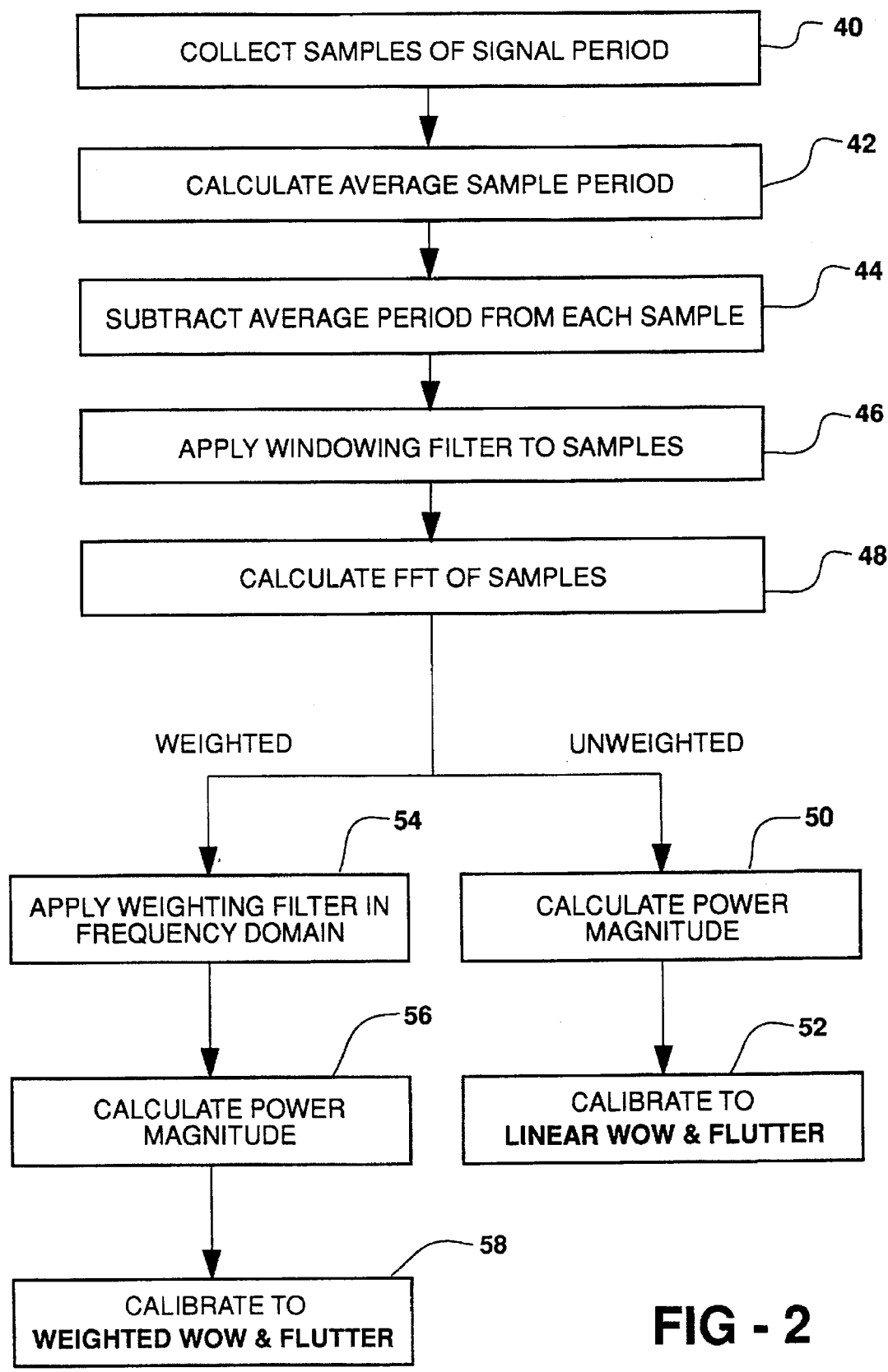
FIG. 2 is a flow chart of a wow and flutter analysis method according to the invention.

The method used by the computer program to analyze the samples is generally shown by the flow chart of FIG. 2 wherein the functional description of each block in the chart is accompanied by a number in angle brackets <nn> which corresponds to the reference number of the block. The first step of collecting samples of the signal periods <40> has already been described as the accumulation of period measurements in RAM. Next the average of the sample periods is calculated <42> and the average is subtracted from each period <44>. This removes the fundamental frequency from the data to yield a amplitude modulated waveform representation of period deviation from a norm. In order to apply FFT calculations to the deviation data, the data is filtered to conform to FFT requirements <46>. Then FFT calculations are performed <48> to transform the period deviation data to frequency domain. Where unweighted results are desired, the power magnitude of the frequency data is calculated <50> and that value is calibrated to yield linear wow and flutter <52>. The calibration involves empirically determining a factor which is multiplied by the power magnitude to effect agreement with conventional methods of measuring wow and flutter. If weighted results are desired, a weighting filter is applied to the frequency domain data <54> and then power magnitude is calculated <56>, and finally that value is calibrated to produce weighted wow and flutter <58>.

The method described here has proven to give accurate measurements and is as fast or faster than conventional wow and flutter measurements; moreover, the required equipment is very much less expensive than the conventional apparatus.

The embodiments of the invention in which an exclusive property or privilege is claimed are defined as follows:

1. The method of analyzing speed deviation of a device for playing recorded sound comprising the steps of:

playing media having a tone recorded at a fixed frequency;

digitally sampling the period of each cycle of the tone over a test interval;

calculating the average sample period;

subtracting the average period from each sampled period in the test interval to obtain an amplitude modulated waveform of period deviation representing speed deviation;

deriving frequency domain data by calculating the FFT of the waveform; and calculating true RMS measurements of speed deviation from the frequency domain data.

2. The method of analyzing speed deviation of a tape player comprising the steps of:

playing a tape having a tone recorded at a fixed frequency to yield audio signals affected by the speed deviation;

converting the audio signals to square wave pulses;

measuring and storing the width of each pulse; and converting the pulse width data to an amplitude modulated waveform of pulse width deviation representing tape speed deviation.

3. The invention as defined in claim 2 wherein the step of converting the pulse width data to an amplitude modulated waveform comprises:

determining the average pulse width; and subtracting the average pulse width from each pulse width to derive pulse width deviation data.

4. The invention as defined in claim 2 including:

calculating the FFT of the waveform to obtain data in the frequency domain; and calculating the power magnitude from the data in the frequency domain.

5. The invention as defined in claim 2 including:

calculating the FFT of the waveform to obtain data in the frequency domain;

applying a weighting filter in the frequency domain; and calculating the power magnitude from the data in the frequency domain.

6. Apparatus for measuring wow and flutter of a tape player by detecting deviations of a tone signal played by the player comprising:

an interface circuit for connection to the player to receive the played tone signal and for converting the signal to a square wave signal;

a computer having an input port for receiving the square wave signal and a timing circuit for measuring the width of each pulse;

the computer further having means for determining the deviation of measured pulse widths from a norm and means for calculating a value of wow and flutter from the pulse widths;

wherein the means for determining the deviation of measured pulse widths from a norm comprises means for averaging the pulse widths and subtracting the average from the pulse widths.

7. The invention as defined in claim 6 wherein:

the means for calculating a value of wow and flutter includes fast Fourier transform means for converting the deviation data to frequency domain and means for calculating true RMS values of speed deviation.

* * * * *